United States Patent [19]
Shibanushi et al.

[11] Patent Number: 5,953,863
[45] Date of Patent: Sep. 21, 1999

[54] MOUNTING JIG FOR TEMPORARILY-RETAINING CLIP SET FOR WINDOW GLASS

[75] Inventors: Yoshio Shibanushi; Keiichi Fukushima, both of Aichi-ken, Japan

[73] Assignee: Nifco Inc., Kanagawa, Japan

[21] Appl. No.: 08/782,784

[22] Filed: Jan. 13, 1997

Related U.S. Application Data

[62] Division of application No. 08/558,886, Nov. 16, 1995, Pat. No. 5,673,904.

[51] Int. Cl.⁶ ................................. B60J 1/00; B60J 1/02
[52] U.S. Cl. .................. 52/127.1; 52/749.1; 52/DIG. 1; 29/243.56; 29/270; 29/283; 294/15
[58] Field of Search ............................... 52/127.1, 749.1, 52/DIG. 1; 29/243.56, 270, 278, 283; 294/15

[56] References Cited

U.S. PATENT DOCUMENTS

| | | | |
|---|---|---|---|
| 3,030,701 | 4/1962 | Regennitter | 29/270 |
| 3,178,214 | 4/1965 | Tinkellenberg | 294/15 |
| 3,965,776 | 6/1976 | Wolstenholme et al. | 29/243.56 X |
| 3,974,556 | 8/1976 | Kubik | 29/278 X |
| 4,215,468 | 8/1980 | Gerco | 29/278 X |

FOREIGN PATENT DOCUMENTS

7/15410  3/1995  Japan .

*Primary Examiner*—Robert Canfield
*Attorney, Agent, or Firm*—Cowan, Liebowitz & Latman, P.C.

[57] ABSTRACT

A mounting jig for positioning and adhering respective temporarily-retaining clips of a clip set for a window glass at a peripheral edge portion of the window glass includes a body, two nippers positioned at an end portion of the body which nip a pair of strut members of the clip set, and a positioner provided for each nipper which abuts an edge of the window glass to position the nippers at the peripheral edge portion of the window glass.

9 Claims, 8 Drawing Sheets

MOUNTING JIG FOR TEMPORARILY-RETAINING CLIP SET FOR WINDOW GLASS

This application is a division of application Ser. No. 08/558,886, filed Nov. 16, 1995, now U.S. Pat. No. 5,673,904.

BACKGROUND OF THE INVENTION

1. Field of the Invention

The present invention relates to a temporarily-retaining clip for a window glass which, when a window glass is fixed to a body opening portion of an automobile by an adhesive, holds the window glass at the body opening portion until the adhesive hardens, and in particular, to a temporarily-retaining clip set for a window glass in which two temporarily-retaining clips for a window glass are connected, and to a mounting jig for mounting the temporarily-retaining clip set for a window glass to the window glass.

2. Description of the Related Art

Figure 7:
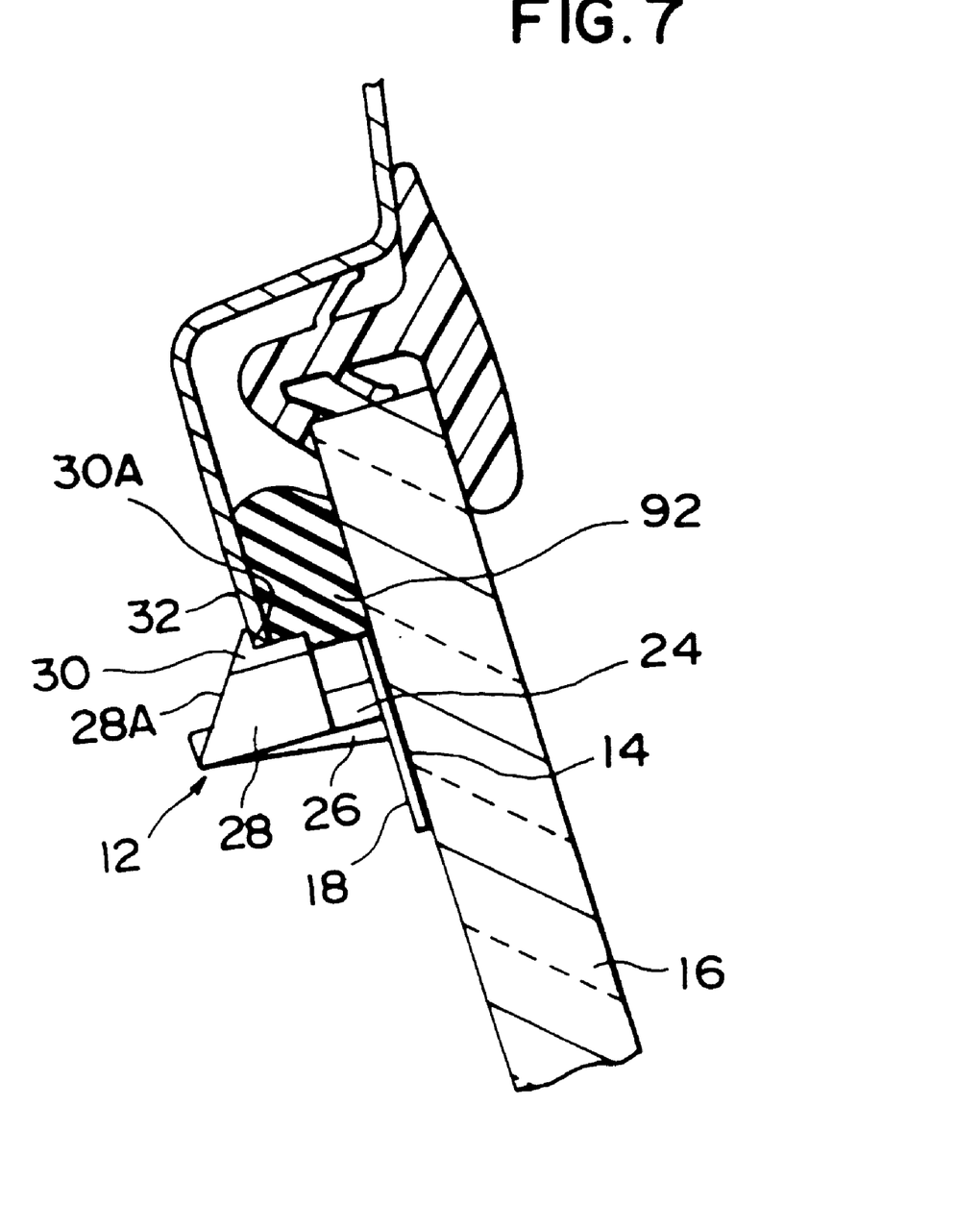
FIG. 7 is a cross-sectional view illustrating a mounted state of the temporarily-retaining clip for a window glass relating to the present embodiment.
Figure 8:
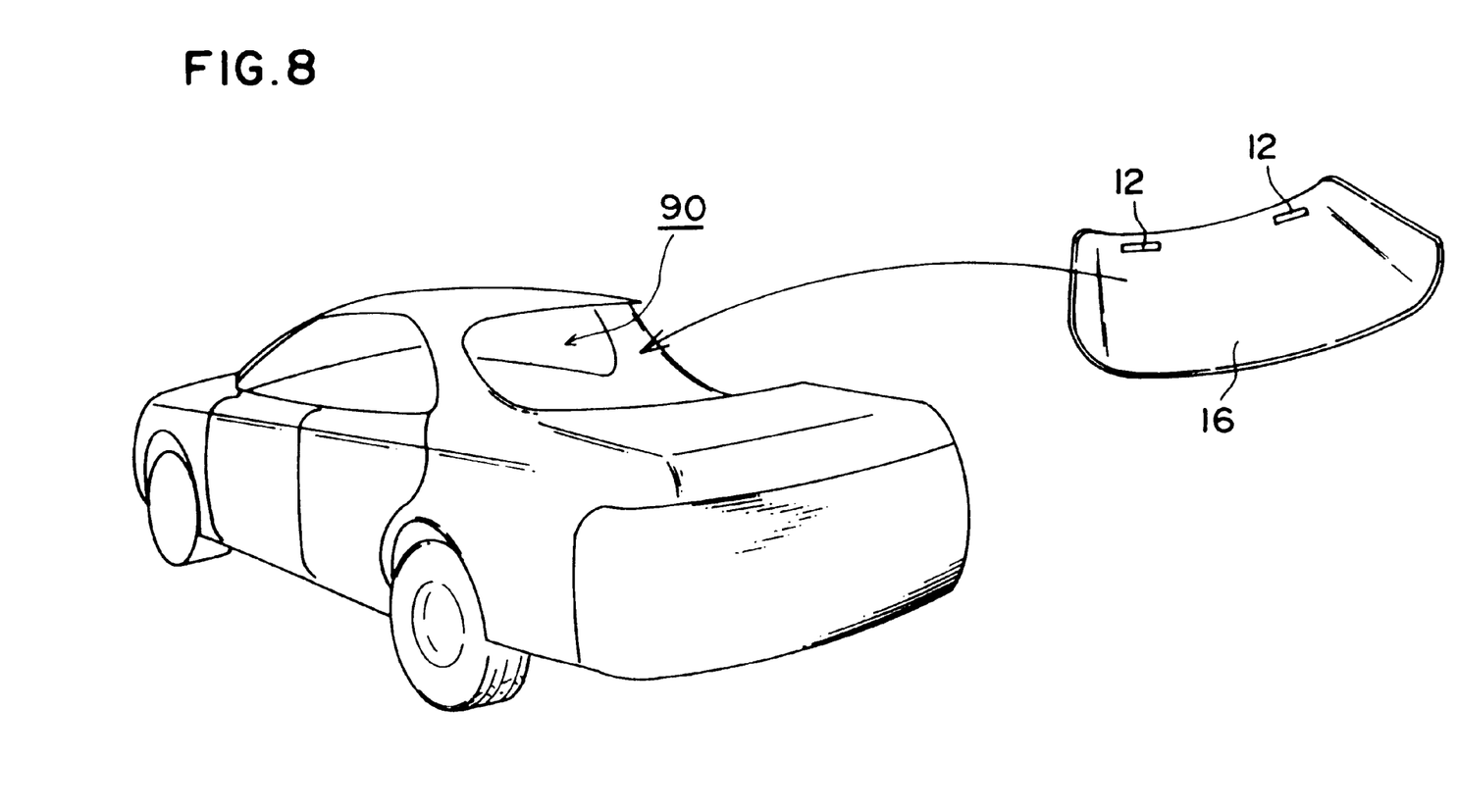
FIG. 8 is a conceptual view illustrating a state in which the window glass is fitted into a body opening portion.

As illustrated in FIGS. 7 and 8, a window glass 16 is fixed to a body opening portion 90 of an automobile by an adhesive 92. The window glass 16 is held, until the adhesive 92 hardens, by temporarily-retaining clips 12 adhered to the window glass 16.

A thin base plate 18 of the temporarily-retaining clip 12 is adhered to the window glass 16 by double-sided tape 14. An elastic member 28 projects from a supporting pillar 24 which stands on the base plate 18. A pawl portion 30 projects from the distal end of the elastic member 28. The pawl portion 30 engages a mounting flange 32 of the opening portion. Until the adhesive 92 hardens, the window glass 16 is held so as to not rise up.

In consideration of the costs involved in applying the adhesive 92, it is necessary to adhere the temporarily-retaining clip 12 a predetermined distance from the edge portion of the window glass 16.

In order to accelerate the adhering work, there exists a method of utilizing a mounting jig having a holding means which can hold the temporarily-retaining clip 12 and having a positioning portion which abuts the edge portion of the window glass 16 so as to position the holding means at a predetermined position.

However, work efficiency does not improve as the temporarily-retaining clips 12 are one by one picked up, placed in the mounting jig, and adhered to the window glass 16.

As a result, there has been proposed a temporarily-retaining clip part which is equipped with a positioning function and in which a thin plate of a size which can be held by fingers is formed integrally with the temporarily-retaining clip via a connecting member which can be cut out by being folded over.

However, forming the thin plate, which is of the above-described size and which had theretofore been unnecessary, integrally with the temporarily-retaining clip is wasteful in terms of molding materials. Further, because the thin plate occupies a large area in the mold, the number of temporarily-retaining clips produced per batch decreases, and production costs cannot be reduced.

SUMMARY OF THE INVENTION

In view of the aforementioned, an object of the present invention is to provide a temporarily-retaining clip set for a window glass and a mounting jig therefor in which waste of molding materials is reduced and work efficiency in adhering improves.

A temporarily-retaining clip set for a window glass of the first aspect of the present invention comprises: two temporarily-retaining clips for a window glass, each temporarily-retaining clip for a window glass having a base plate, a first surface of the base plate being adhered to a peripheral edge portion of a window glass, and elastic supporting bodies extending from a second surface of the base plate which is opposite the first surface, the elastic supporting bodies engaging a mounting flange provided at an edge portion of an opening portion in which the window glass is mounted; and connecting members connecting the second surfaces of the base plates of the two temporarily-retaining clips such that the second surfaces face each other with a predetermined gap being formed therebetween, the connecting members enabling cancellation of connection of the base plates.

In the temporarily-retaining clip set for a window glass of the first aspect, the base plates which are to be adhered to a window glass are connected by the connecting members such that the second surfaces of the base plates face each other and such that there is a predetermined space between the base plates. The connecting members are nipped, and the base plate of one of the temporarily-retaining clips is adhered to the window glass. If the connection of the connecting members is undone, the one temporarily-retaining clip adhered to the window glass (i.e., the aforementioned one temporarily-retaining clip) breaks off from the connecting members. Next, the connecting members are inverted, and the base plate of the other temporarily-retaining clip is adhered to the window glass. If the connection of the connecting members is undone again, the connecting members break off from the temporarily-retaining clip. In this way, work for adhering the temporarily-retaining clips can be carried out in succession.

A temporarily-retaining clip set for a window glass of the second aspect comprises: two temporarily-retaining clips for a window glass, each temporarily-retaining clip for a window glass having a base plate, a first surface of the base plate being adhered to a peripheral edge portion of a window glass, and elastic supporting bodies extending from a second surface of the base plate which is opposite the first surface, the elastic supporting bodies engaging a mounting flange provided at an edge portion of an opening portion in which the window glass is mounted; and strut members connecting the second surfaces of the base plates of the two temporarily-retaining clips such that the second surfaces face each other with a predtermined gap being formed therebetween, thin portions which enable cancellation of connection of the base plates and the strut members being formed at portions at which the strut members and the base plates are joined together.

In the temporarily-retaining clip set for a window glass of the second aspect, the connecting members of the first aspect are formed by strut members. Thin portions are formed at portions joining the strut members and the base plates. The strut members are nipped, and the base plate is adhered to the window glass. In this state, if the strut members are twisted, the thin portions break, and the one temporarily-retaining clip adhered to the window glass breaks off from the strut members. Next, the strut members are inverted, and the base plate of the other temporarily-retaining clip is adhered to the window glass. If the strut members are twisted again, the thin portions break, and the strut members break off from the temporarily-retaining clip.

In this way, in the temporarily-retaining clip set, the two temporarily-retaining clips are connected merely by the strut members. Therefore, as compared with the conventional molding of thin plates, there is a reduction in the materials used for molding, and the strut members do not occupy a large surface area in the mold. Therefore, the number of temporarily-retaining clips produced per batch increases, and production costs can be decreased.

In a temporarily-retaining clip set for a window glass of a third aspect, the outer diameters of the longitudinal direction end portions (first and second portions) of the strut members are respectively different.

The fourth aspect of the present invention is a mounting jig for positioning a temporarily-retaining clip set for a window glass at a peripheral edge portion of a window glass and for adhering the temporarily-retaining clip set for a window glass to the peripheral edge portion of the window glass, the temporarily-retaining clip set for a window glass having: two temporarily-retaining clips for a window glass, each temporarily-retaining clip for a window glass having a base plate, a first surface of the base plate being adhered to the peripheral edge portion of the window glass, and elastic supporting bodies extending from a second surface of the base plate which is opposite the first surface, the elastic supporting bodies engaging a mounting flange provided at an edge portion of an opening portion in which the window glass is mounted; and a pair of strut members connecting the second surfaces of the base plates of the two temporarily-retaining clips such that the second surfaces face each other with a predetermined gap being formed therebetween, the strut members having thin portions which enable cancellation of connection of the base plates and the strut members, the mounting jig comprising: a body for holding; a pair of nipping means provided at an end portion of the body for holding so as to correspond to the pair of strut members, the nipping means respectively nipping the strut members; and positioning portions provided at both sides of each nipping means of the pair of nipping means, and abutting an edge of the window glass, and positioning the nipping means at the peripheral edge portion of the window glass.

The fifth aspect of the present invention is a mounting jig for positioning a temporarily-retaining clip set for a window glass at a peripheral edge portion of a window glass and for adhering the temporarily-retaining clip set for a window glass to the peripheral edge portion of the window glass, the temporarily-retaining clip set for a window glass having: two temporarily-retaining clips for a window glass, each temporarily-retaining clip for a window glass having: a base plate, a first surface of the base plate being adhered to the peripheral edge portion of the window glass, and elastic supporting bodies extending from a second surface of the base plate which is opposite the first surface, the elastic supporting bodies engaging a mounting flange provided at an edge portion of an opening portion in which the window glass is mounted; and two strut members connecting the second surfaces of the base plates of the two temporarily-retaining clips such that the second surfaces face each other with a predetermined gap being formed therebetween, the strut members having thin portions which enable cancellation of connection of the base plates and the strut members, wherein each strut member of the two strut members has a first portion along a longitudinal direction at one end and a second portion along the longitudinal direction at another end, the first portion and the second portion having respectively different outer diameters, the two strut members being joined to the base plates such that the first portion of one of the strut members and the second portion of another of the strut members are joined to one of the base plates, and the second portion of the one of the strut members and the first potion of the other of the strut members are joined to the other of the base plates. the mounting jig comprising: a body for holding; two nipping means provided at an end portion of the body for holding so as to correspond to the two strut members, the nipping means respectively nipping the strut members; positioning portions provided at both sides of each nipping means of the two nipping means, and abutting an edge of the window glass, and positioning the nipping means at the peripheral edge portion of the window glass; and two engaging portions, the two engaging portions being provided respectively at the nipping means, wherein one of the engaging portions corresponds to outer diameters of the first portion and the second portion of one strut member of the two strut members, and the one engaging portion engages the one strut member, and another of the engaging portions corresponds to outer diameters of the first portion and the second portion of another strut member of the two strut members, and the other engaging portion engages the other strut member.

By using the mounting jigs of the fourth and fifth aspects, the efficiency of the work involved in adhering the temporarily-retaining clips to the window glass improves.

A worker grasps the body for holding. The two strut members of the temporarily-retaining clip set are nipped by two nipping means provided at an end portion of the body for holding. Ones of the positioning portions formed at both sides of the nipping means are abutted against the edge portion of the window glass. The temporarily-retaining clip is positioned, and is adhered to a predetermined position of the peripheral edge portion of the window glass.

After the temporarily-retaining clip has been adhered, if the body for holding is twisted, the thin portions break, and the temporarily-retaining clip breaks off from the strut members. Next, the holding jig is inverted, and the other positioning portions are abutted against the edge portion of the window glass. The temporarily-retaining clip is positioned and is adhered to a predetermined position of the peripheral edge portion of the window glass. After the temporarily-retaining clip has been adhered, the body for holding is twisted, and the strut members break off from the temporarily-retaining clip.

Because work for adhering two temporarily-retaining clips to a window glass can be carried out by holding the two temporarily-retaining clips at one time, continuous work is made possible.

Further, when the base plate of the temporarily-retaining clip is adhered to the window glass, the distal ends (engaging sides) of the elastic supporting bodies extending from the second surface must be oriented in the direction of the edge portion of the window glass. Therefore, it is necessary to confirm the orientation of the temporarily-retaining clip when the temporarily-retaining clip is nipped by the mounting jig.

Here, in the third and fifth aspects, the outer diameters of the first portions and the second portions of the two strut members of the temporarily-retaining clip set are different, and the two strut members are joined to the base plates oppositely. The two nipping means are provided with first and second engaging portions which correspond to the opposite states of the strut members and which are engageable therewith. Accordingly, even if the orientation of the temporarily-retaining clip is not confirmed. If the first and second engaging portions of the two nipping means of the mounting jig of the fifth aspect are engageable with the two strut members, the elastic supporting bodies are of necessity set so as to be oriented toward the edge portion of the window glass, and mistakes in adhering the temporarily-retaining clip are eliminated.

DESCRIPTION OF THE PREFERRED EMBODIMENT

[Temporarily-Retaining Clip]

Figure 2:
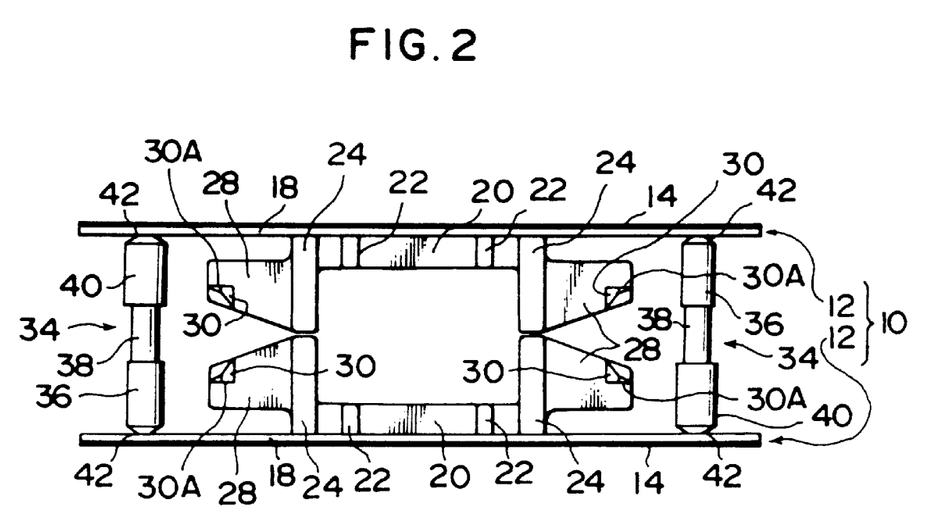
FIG. 2 is a front view of the temporarily-retaining clip set for a window glass relating to the present embodiment.

As illustrated in FIGS. 2 and 7, a temporarily-retaining clip 12 has a long-plate-shaped base plate 18 which is adhered to a window glass 16 by double-sided tape 14. A plate-shaped supporting body 20 stands on the base plate 18 along the longitudinal direction thereof. The supporting body 20 is a rigid body, and the intermediate portion thereof is reinforced by stays 22.

Supporting pillars 24 stand at the end portions of the supporting body 20. The base portions of the supporting pillars 24 are reinforced by ribs 26 which stand on the base plate 18. An elastic member 28 projects from each supporting pillar 24. The distal end portions of the elastic members 28 extend at angles outwardly from above the base plate 18 in directions of moving apart from each other.

A pawl portion 30 projecting outwardly from above the base plate 18 is formed at the distal end of the elastic member 28. An engaging surface 30A parallel to the base plate 18 is formed at the pawl portion 30. The engaging surface 30A engages an edge portion of a mounting flange 32 (see FIG. 7). Further, a continuous taper surface 28A is formed at the outer side surface of the pawl portion 30 and the outer side surface of the elastic member 28. The engaging of these pawl portions 30 with the mounting flange 32 is carried out in the following manner. By pushing the taper surfaces 28A against the edge portion of the mounting flange 32, the two elastic members 28 are deformed in directions of opening away from each other. When the elastic members 28 have been opened a predetermined amount, the upper surface of the mounting flange 32 reaches the inner sides (the base plate 18 sides) of the pawl portions 30, and the elastic members 28 return to their original states due to the elastic force thereof. The engagement of the temporarily-retaining clip 12 and the mounting flange 32 is thereby carried out.

[Temporarily-Retaining Clip Set]

Figure 1:
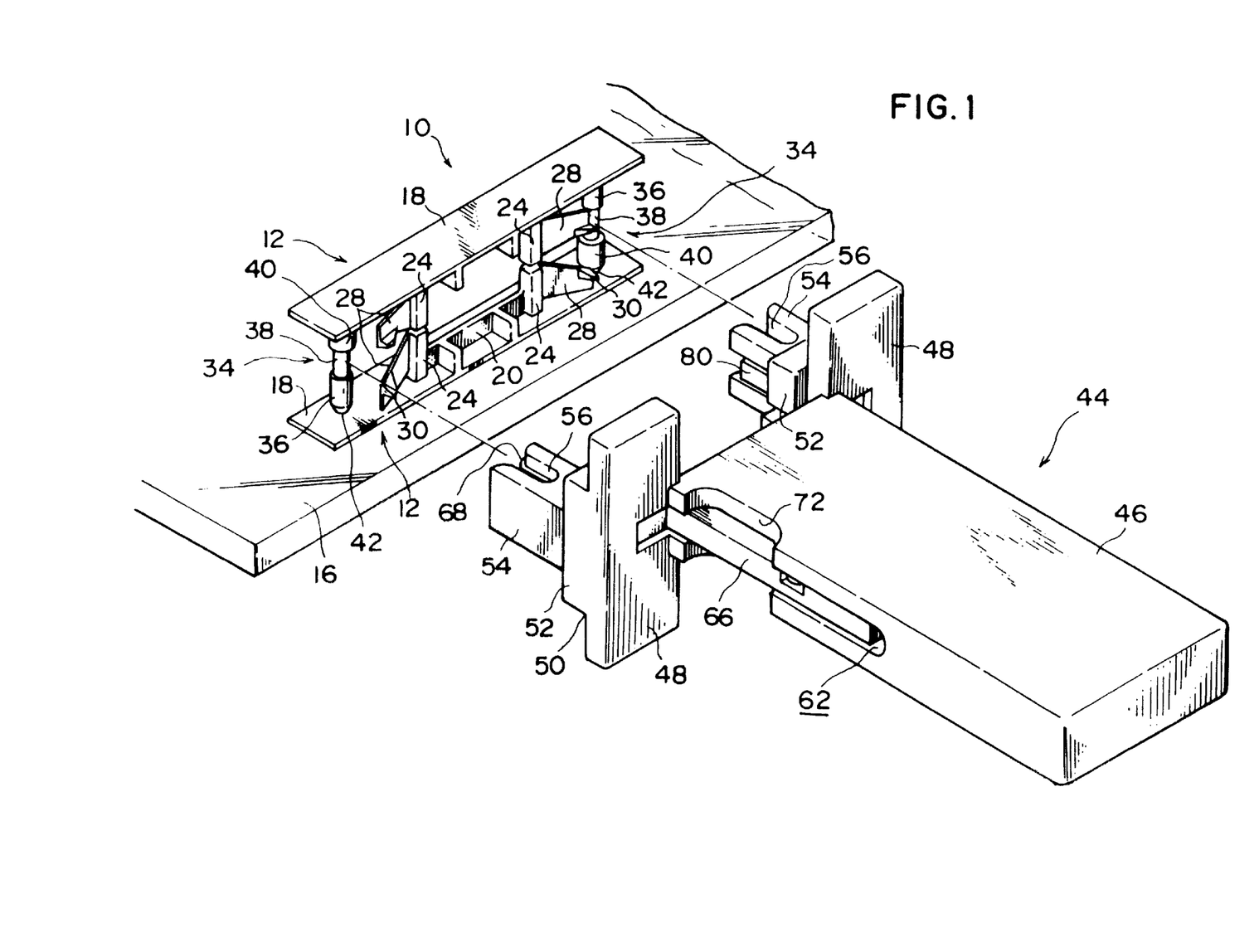
FIG. 1 is an overall perspective view of a temporarily-retaining clip set for a window glass and a mounting jig relating to the present embodiment.

As illustrated in FIGS. 1 and 2, a temporarily-retaining clip set 10 is formed by connecting two temporarily-retaining clips 12 by strut members 34.

The strut members 34 connect both ends of the base plates 18 such that, in a state in which the reverse surfaces of the base plates 18 to which the double-sided tape 14 is adhered face each other, a predetermined space is formed such that the supporting pillars 24 do not interfere with each other. The strut member 34 has a cylindrical medium-diameter portion 36, a cylindrical small-diameter portion 38 and a cylindrical large-diameter portion 40 along the axial direction thereof. The connecting portions between the medium-diameter portions 36 and the base plates 18 and between the large-diameter portions 40 and the base plates 18 are thin thin portions 42 whose diameters decrease conically. When torsional force is applied to the strut members 34, the thin portions 42 break, and the strut members 34 are severed from the base plate 18.

Further, the medium-diameter portion 36 and the large-diameter portion 40 of the left and right side strut members 34 are in an opposite positional relationship. The strut members 34 can be nipped by a mounting jig 44, which will be described hereinafter, only from the projecting directions of the elastic members 28.

[Mounting Jig]

Figure 3:
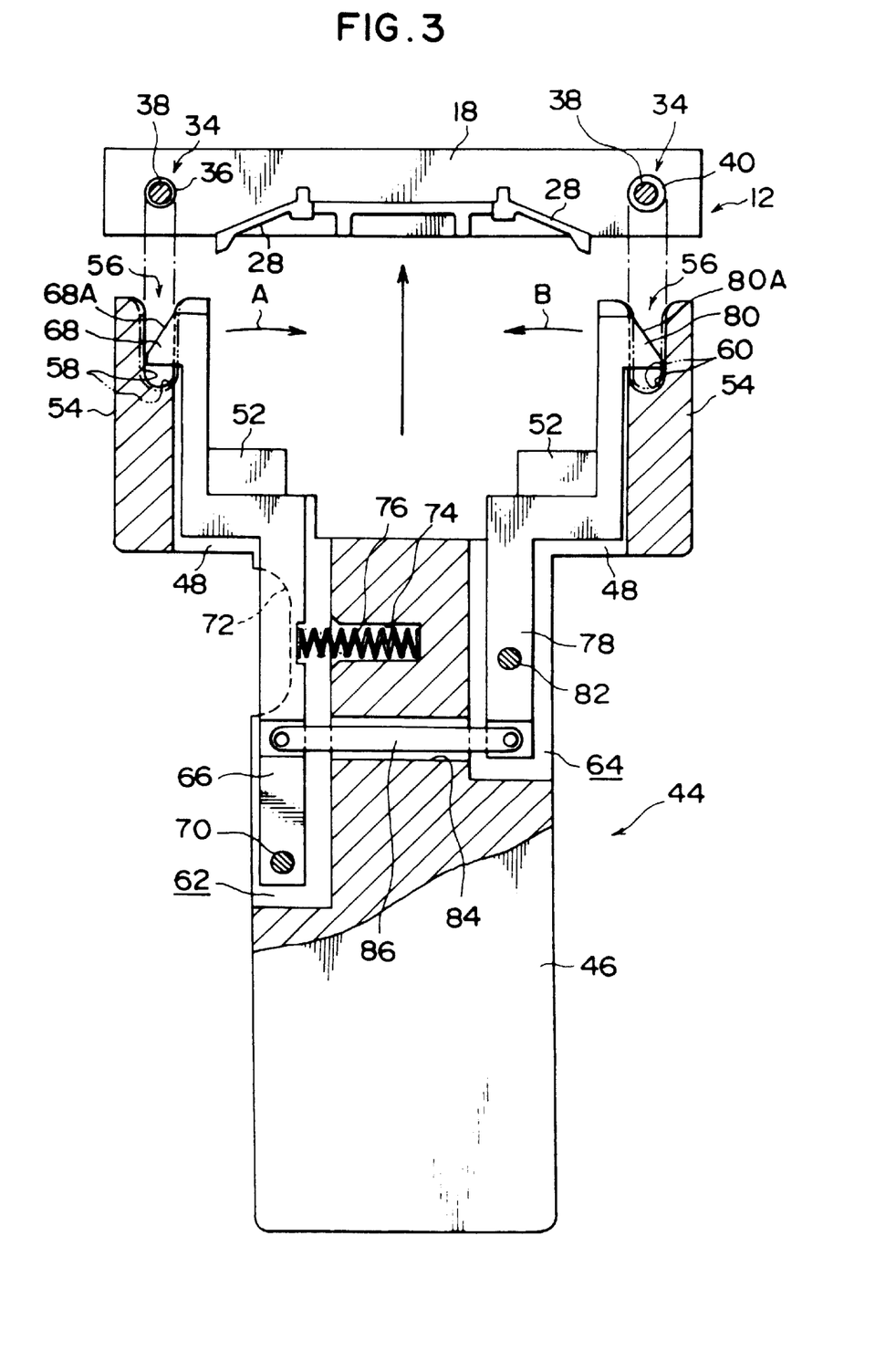
FIG. 3 is a plan view illustrating a partial cross-section of the temporarily-retaining clip set for a window glass and the mounting jig relating to the present embodiment.
Figure 4:
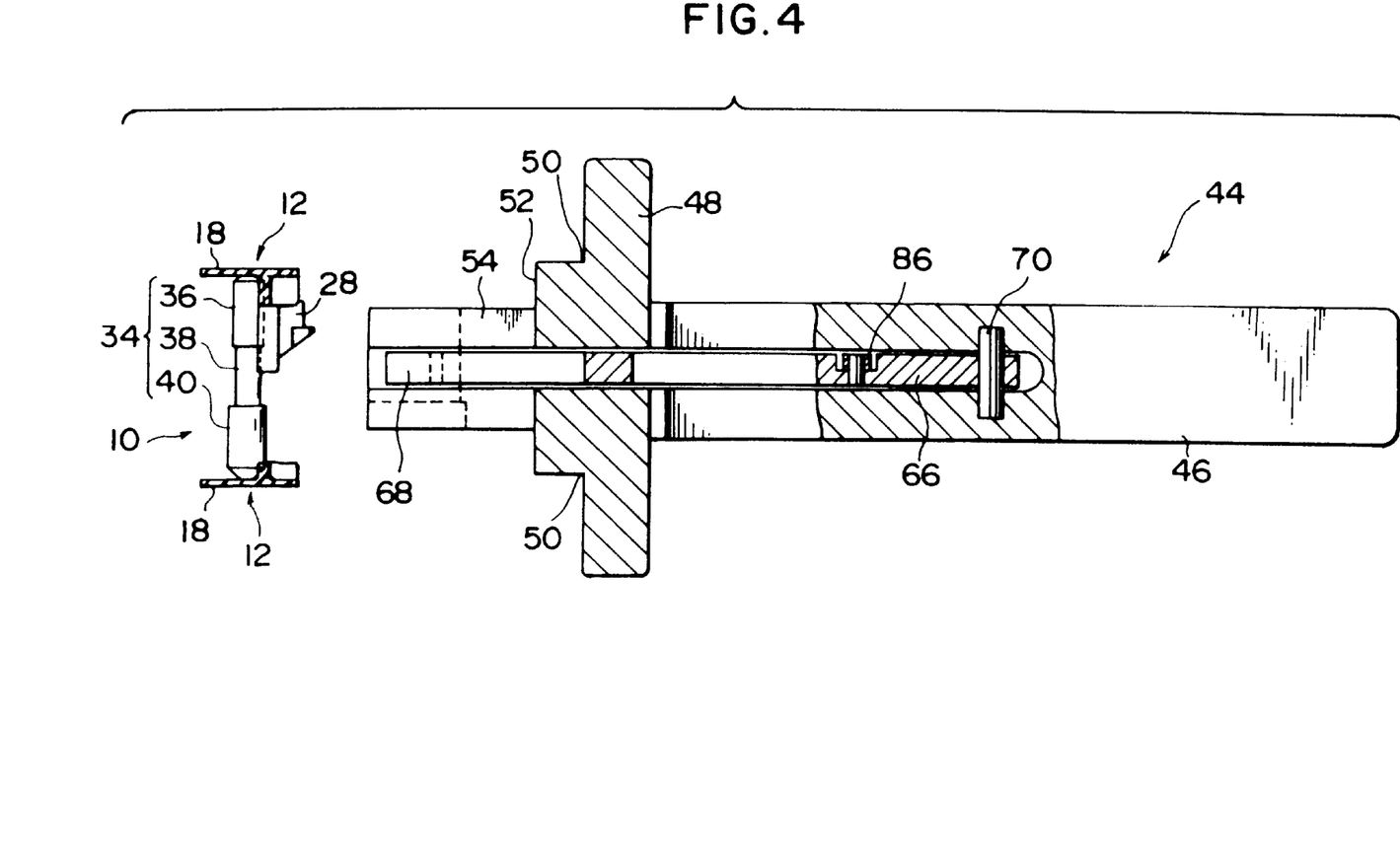
FIG. 4 is a cross-sectional view illustrating the temporarily-retaining clip set for a window glass and the mounting jig relating to the present embodiment.

As illustrated in FIGS. 3 and 4, the mounting jig 44 includes a body for holding 46 which is hold by a worker. At the transverse direction end portions of the distal end of the body for holding 46, substantially rectangular mounting plates 48 jut out to the left and right and to the top and bottom (see FIG. 1). Base stands 52 are stacked on central portions of the mounting plates 48 to form corner portions 50 at both edges which define positioners for positioning the mounting jig 44 relative to a window glass 16, as discussed below. Nippers which nip the strut members 34 include nipping bodies 54 projecting from the base stands 52. U-shaped elongated grooves 56, which engage the strut members 34, are formed in the nipping bodies 54 along the direction of thickness of the body for holding 46. As illustrated in the plan view of FIG. 3, a step portion 58 is formed in the left elongated groove 56, and a step portion 60 is formed in the right elongated groove 56. The inner diameter of the upper side of the step portion 58 is large (illustrated by the dot-chain line), and the inner diameter of the lower side thereof is small (illustrated by the solid line). The inner diameter of the upper side of the step portion 60 is small (illustrated by the dot-chain line) and the inner diameter of the lower side thereof is large (illustrated by the solid line). The step portions 58, 60 are engageable with the large-diameter portions 40 and the medium-diameter portions 36 of the strut members 34 which are disposed such that the top and bottom of one strut member 34 are opposite those of the other strut member 34. Therefore, the step portions 58, 60 can only nip the strut members 34 from the elastic member 28 projecting direction sides. Accordingly, even if the orientation of the temporarily-retaining clip 12 is not confirmed, the temporarily-retaining clip 12 will necessarily be set such that the elastic members 28 are positioned at the edge portion side of the window glass 16 (see FIG. 5).

Hollow portions 62, 64 whose side surfaces are open are formed in the transverse direction end portions of the body for holding 46. A driving member 66 is disposed in the hollow portion 62. The driving member 66 extends along the hollow portion 62. From the final end of this segment, the driving member 66 bends outwardly and passes through the mounting plate 48 and the base stand 52, and from the final end of this segment, extends along the nipping body 54. A pawl portion 68 which enters into and exits from the elongated groove 56 is formed at the distal end portion of the driving member 66. The pawl portion 68 nips the small-diameter portion 38 of the strut member 34 at the intermediate portion of the step portion 58.

The proximal end of the driving member 66 is shaft-supported by a pin 70 so as to be rotatable. By pressing a portion of the driving member 66 which is exposed from an operation opening 72 formed by cutting a side surface of the body for holding 46, the driving member 66 rotates in the direction of arrow A such that the pawl portion 68 withdraws from the elongated groove 56.

Further, a spring accommodating hole 74 is formed at a position corresponding to the operation opening 72. A push spring, i.e., a coil spring 76, is accommodated in the spring accommodating hole 74. One end of the coil spring 76 abuts the driving member 66 and urges the driving member 66 in the direction opposite to arrow A so that the pawl portion 68 is positioned within the elongated groove 56.

A driving member 78 is disposed in the hollow portion 64. The driving member 78 extends along the hollow portion 64. From the final end of this segment, the driving member 78 bends outwardly and passes through the mounting plate 48 and the base stand 52, and from the final end of this segment, extends along the nipping body 54. A pawl portion 80 which enters into and exits from the elongated groove 56 is formed at the distal end portion of the driving member 78. The pawl portion 80 nips the small-diameter portion 38 of the strut member 34 at the intermediate portion of the step portion 60. A vicinity of the proximal end of the driving member 78 is shaft-supported by a pin 82.

The hollow portion 62 and the hollow portion 64 penetrate through a through path 84 provided along the transverse direction of the body for holding 46. A link member 86 is provided in the through path 84. One end of the link member 86 is rotatably connected to the proximal end of the driving member 78, whereas the other end is rotatably connected to the driving member 66 at a portion thereof at the pawl portion 68 side of the pin 70. In this way, when the driving member 66 rotates, the driving member 78 rotates synchronously therewith in the direction of arrow B around the pin 82.

Next, the processes for mounting the temporarily-retaining clip 12 to the window glass 16 will be described As illustrated in FIG. 8, the temporarily-retaining clips 12 are adhered to two places on the peripheral edge portion of the window glass 16.

First, the body for holding 46 is grasped, and the strut members 34 are pushed into the elongated grooves 56. Here, the small-diameter portions 38 abut taper surfaces 68A, 80A of the pawl portions 68, 80. As the pawl portions 68, 80 withdraw from the elongated grooves 56, the small-diameter portions 38 engage with the elongated grooves 56. When the clip set is presented inverted to the mounting jig, the large-diameter portions 40 and the medium-diameter portions 36 are reversed and do not engage with the step portions 58, 60 of the elongated grooves 56. Therefore, the strut members 34 can be nipped from the elastic member 28 projecting direction sides without the worker having to pay special attention.

When the strut members 34 engage the elongated holes 56, the driving member 66 rotates in the direction opposite to the direction of arrow A due to the urging force of the push spring 76. Synchronously with the rotation of the driving member 66, the dirving member 78 rotates in the direction opposite to the direction of arrow B. The pawl portions 68, 80 move into the elongated grooves 56 and nip the small-diameter portions 38 of the strut members 34.

Figure 5:
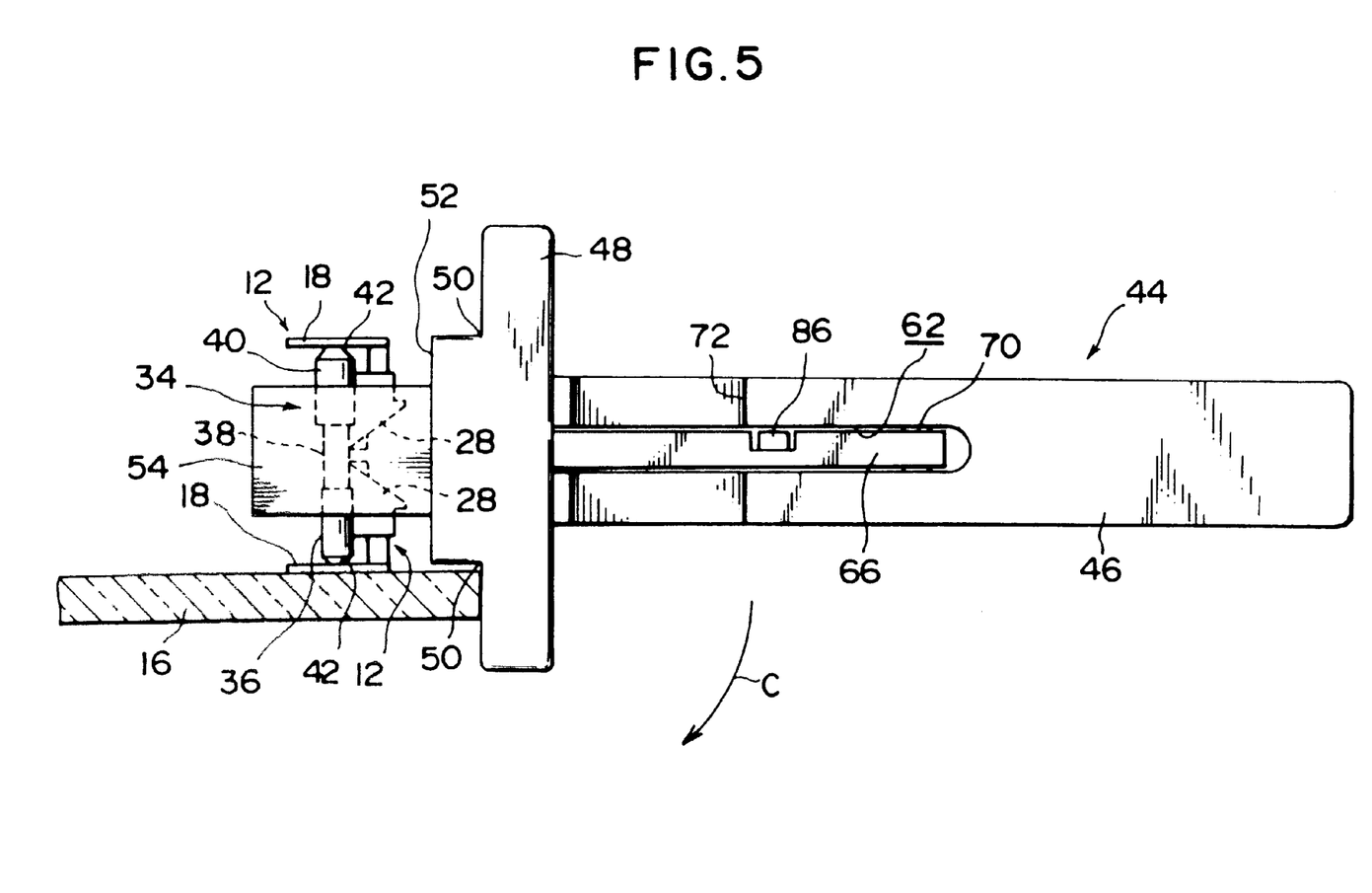
FIG. 5 is a side view illustrating a state in which the temporarily-retaining clip set for a window glass relating to the present embodiment is nipped by the mounting jig and is adhered to a window glass.

Here, as illustrated in FIG. 5, the double-sided tape 14 of the base plate 18 is peeled, and the corner portions 50 (which function as positioners as mentioned above) of the mounting jig 44 are pushed to abut the edge portion of the window glass 16 to position the temporarily-retaining clip 12, and the base plate 18 is adhered to the window glass 16.

Next, when the mounting jig 44 is twisted in the direction of arrow C with the corner portions 50 used as fulcra, the thin portions 42 break, and the temporarily-retaining clip 12 is severed from the strut members 34.

Figure 6:
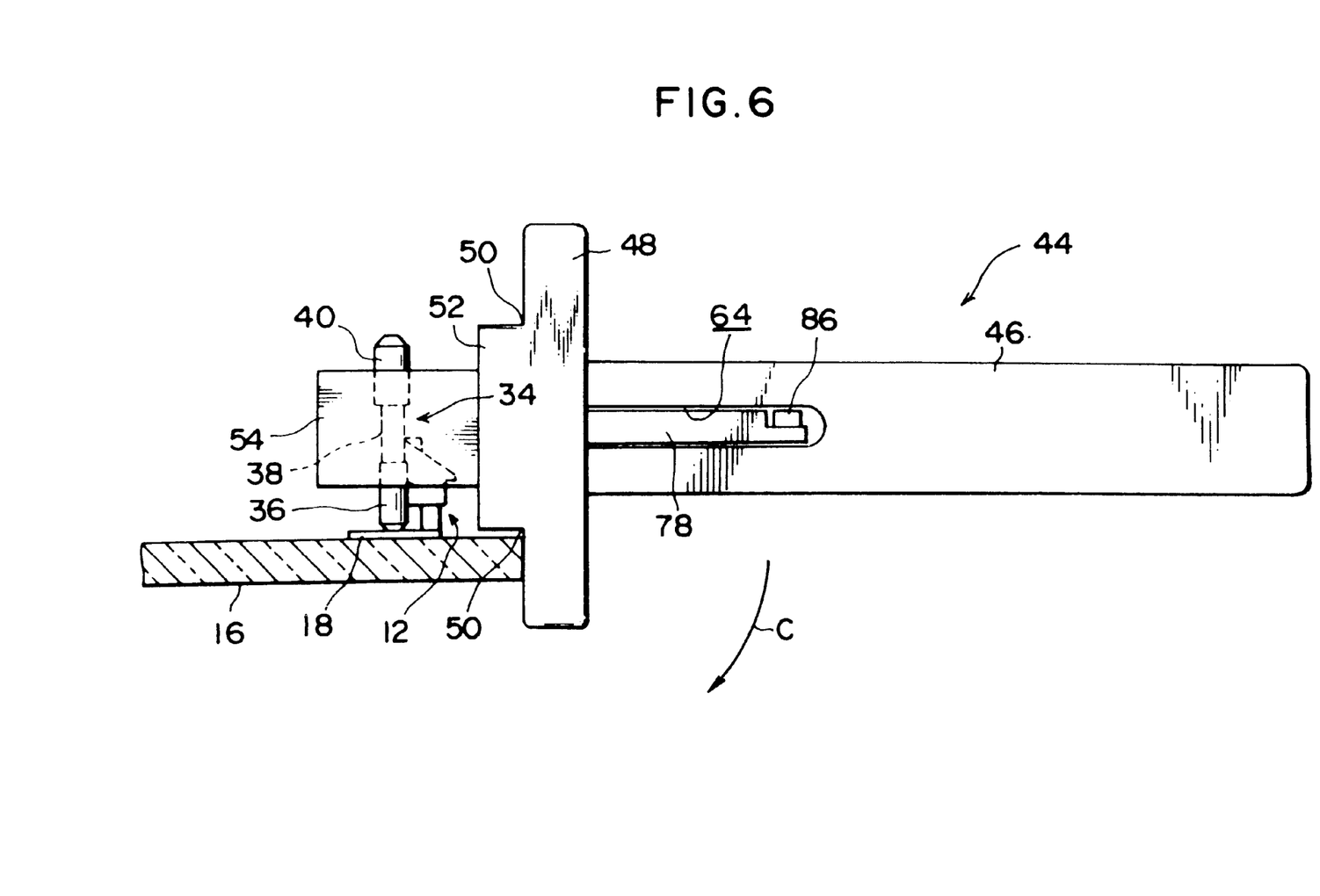
FIG. 6 is a side view illustrating a state in which the temporarily-retaining clip set for a window glass relating to the present embodiment is nipped by the mounting jig, thin portions of strut members are broken, the mounting jig is inverted, and a temporarily-retaining clip is adhered to the window glass.

Subsequently, as illustrated in FIG. 6, if the mounting jig 44 is inverted and the above-described operations are carried out, the temporarily-retaining clip 12 is adhered to another region of the window glass 16, and only the supporting members 34 are held by the nipping bodies 54 of the mounting jig 44. If the portion of the driving member 66 exposed from the operation opening 72 is pushed, the strut members 34 are released smoothly from the pawl portions 68, 80, and can easily be placed in a trash can or the like.

In this way, if the temporarily-retaining clip set 10 is nipped by the mounting jig 44 a single time, the temporarily-retaining clips 12 can be adhered consecutively to two regions of the peripheral edge portion of the window glass 16. Therefore, work efficiency improves. Further, because the strut members 34 are small, the strut members 34 can be broken with less waste of molding materials and without being made bulky.

The structure of the temporarily-retaining clip 12 is not limited to the structure described in the above embodiment, and any type may be used. Further, although the cylindrical strut members are used as the means for connecting the temporarily-retaining clips in the above embodiment, thin plate-shaped members may also be used.

What is claimed is:

1. A mounting jig for positioning and adhering respective temporarily-retaining clips of a clip set for a window glass at a peripheral edge portion of the window glass comprising:

a body;

a pair of nippers provided at an end portion of said body adapted to nip respectively a pair of strut members of the clip set, and at least one positioner provided for said pair of nippers adapted to abut an edge of the window glass, said at least one positioner when abutting the edge of the window glass positioning said nippers at the peripheral edge portion of the window glass.

2. A mounting jig according to claim 1, further comprising:

operating means provided at said body for operating said nippers to nip the strut members in response to a pushing of said mounting jig relative to the clip set.

3. A mounting jig according to claim 2, wherein said operating means comprises a link mechanism which links said nippers, said operating means directly operating one of said nippers, and simultaneously operating another of said nippers through said link mechanism.

4. A mounting jig according to claim 1, comprising a pair of positioners, one for each nipper, each positioner of said pair of positioners being located adjacent the respective nipper.

5. A mounting jig for positioning and adhering respective temporarily-retaining clips of a clip set for a window glass at a peripheral edge portion of the window glass comprising:

a body;

two nippers provided at an end portion of said body adapted to nip respectively two strut members of the clip set, said nippers being adapted to respectively nip the strut members;

at least one positioner provided for said two nippers adapted to abut an edge of the window glass, said at least one positioner when abutting the edge of the window glass positioning said nippers at the peripheral edge portion of the window glass; and which have first and second portions of different diameter at which the respective strut member is connected to a respective clip, one nipper of said pair of nippers comprising an engaging portion adapted to engage a first portion of a respective strut member and another nipper of said pair of nippers comprising an engaging portion adapted to engage a second portion of a respective strut member.

6. A mounting jig according to claim 5, further comprising:

operating means provided at said body for operating said nippers to nip the strut members in response to a pushing of said mounting jig relative to the clip set.

7. A mounting jig according to claim 6, wherein said operating means comprises a link mechanism which links said nippers, said operating means directly operating one of said nippers, and operating another of said nippers through said link mechanism.

8. A mounting jig according to claim 5, wherein each nipper is adapted to nip a strut member having a third portion between the first and second portions, each nipper comprising a pawl adapted to nip the third portion of a respective strut member.

9. A mounting jig according to claim 5, comprising two positioners, one for each nipper, each positioner of said two positioners being located adjacent the respective nipper.

* * * * *